2,899,462

PRODUCTION OF 2-CARBOXY-2-CARBOXYMETH-YLBICYCLO-[2.2.1]-HEPT-5-ENE

Abraham Bavley, Brooklyn, and Bryce E. Tate, Kew Gardens, N.Y., assignors to Chas. Pfizer & Co., Inc., New York, N.Y., a corporation of Delaware No Drawing. Application January 15, 1957
Serial No. 634,153

3 Claims. (Cl. 260—514)

This invention relates to an improved process for the production of 2-carboxy-2-carboxymethyl-bicyclo-[2.2.1]-hept-5-ene. More particularly, the process of the present invention involves the use of relatively low temperatures and commercially controllable reaction conditions which result in the production of the desired end product in exceptionally high yield and high purity.

In accordance with the process of the present invention, it has been discovered that cyclopentadiene and itaconic acid will react under certain critical conditions to produce an adduct, namely 2-carboxy-2-carboxymethyl-bicyclo-[2.2.1]-hept-5-ene. The critical condition referred to include the use of a specific aqueous organic solvent and a critical temperature range.

In general; the process of the present invention comprises the steps of reacting substantially equimolecular proportions of cyclopentadiene and itaconic acid in an aqueous organic solvent, the organic portion of said solvent consisting of at least one member selected from the group consisting of alkanols and ketones containing a total of up to four carbon atoms, the temperature of the reaction being within the range from about 15 to 100° C.

The cyclopentadiene reactant is most easily obtained from the commercially available dimer of cyclopentadiene. The dimer is converted to cyclopentadiene by distillation at about 130° C. The resulting monomeric product is fairly stable but on prolonged standing tends to convert back to the dimer. Accordingly, and as known, when using this reactant, preferred results are obtained when using cyclopentadiene prepared from the dimer within about twenty-four hours of the time of preparation.

The other reactant, itaconic acid, rearranges at temperatures above about 100° C. to form products such as mesaconic and citraconic acids. Accordingly, the dimer of cyclopentadiene cannot be employed in situ for the purpose of producing cyclopentadiene. Furthermore, and because of the tendency of itaconic acid to rearrange at temperatures above about 100° C., the upper limit of temperature for the present process when high yield and purity are desired is about 100° C.

The useful temperature range of the process of the present invention is from about 15 to about 100° C. A preferred temperature range compatible with high yield and purity and reasonable reaction times if of the order of from about 70 to about 85° C. Temperatures below the lower limit of 15° C. require inordinant times of reaction in order to obtain substantial yields.

The time of reaction in accordance with the present process will, of course, vary with the choice of reaction temperature. However, minimum times of at least two hours are required in order to obtain substantial yields and times of greater than sixteen hours do not appreciably increase the yield, the order of yield in accordance with the present invention being unexpectedly high, i.e., from about 75 to 85% based on the itaconic acid charged.

One of the most critical features of the present invention is the solvent employed. The solvent of the present invention is an aqueous polar organic solvent containing, as the organic portion, an alkanol or ketone having a total of up to four carbon atoms. The preferred solvents are those which are completely miscible with water and boil at temperatures below about 100° C. Acetone, isopropanol and methanol are representative solvents meeting these preferred conditions of miscibility and boiling point.

The ratio of water to organic portion in the solvent depends upon the selection of the organic solvent since the desired reaction involves reacting substantially equimolecular proportions of the reactants. The criterion for the ratio of water to organic portion is fully exemplified in thee specific examples appearing hereinafter. In this connection, it will be noted that the itaconic acid reactant is soluble in the water portion of the solvent and the cyclopentadiene reactant is soluble in the organic portion of the solvent.

Upon completion of reaction, the solvent is preferably removed by distillation under reduced pressure. Thereafter, the crude product may be purified by one or more recrystallization steps, the preferred solvent for recrystallization being an inert low boiling aromatic hydrocarbon such as benzene, toluence, etc. However, other solvents such as water, the lower alkanols or aqueous solutions containing a lower alkanol can often be advantageously employed.

Although not essential, an itaconic acid polymerization inhibitor such as hydroquinone, diphenylamine, methylene blue, etc. may be employed with the result that slightly improved yield results are obtained.

The product produced in accordance with the process of the present invention is a valuable intermediate in the synthesis of the corresponding imide which is described in concurrently filed copending application, Serial No. 634,152. The imides as described in that application are useful as plasticizers and fungicides.

The following examples are for the purpose of illustration only and are not limiting to the scope of the present invention which is set forth in the claims.

EXAMPLE I

*2-carboxy-2-carboxymethyl-bicyclo-[2.2.1]-hept-5-ene*

A mixture of 65 g. (0.50 m.) of itaconic acid, 36 g. (0.55 m.) of cyclopentadiene, 150 ml. of isopropanol, 150 ml. of water and 0.1 g. of hydroquinone was heated under reflux for seven hours. After this time, volatile material was removed in vacuo, and the thick oil which remained was crystallized by boiling with 700 ml. of benzene. The benzene solution was filtered while hot, and, upon cooling, 74 g. of 2-carboxy-2-carboxymethyl-bicyclo-[2.2.1]-hept-5-ene precipitated and was collected by filtration. Concentration of the mother liquors yielded an additional 5 g. of material for a total of 79 g. (80%). The analytical sample, which was recrystallized from benzene melted at 139 to 140° C.

*Analysis.*—Calc. for $C_{10}H_{12}O_4$: carbon, 61.2; hydrogen, 6.17. Found: carbon, 61.6; hydrogen, 6.13.

EXAMPLE II

*2-carboxy-2-carboxymethyl-bicyclo-[2.2.1]-hept-5-ene*

A mixture of 65 g. (0.50 m.) of itaconic acid, 36 g. (0.55 m.) of cyclopentadiene, 150 ml. of acetone and 150 ml. of water was heated under reflux for four hours. After this time, the volatile material was removed in vacuo, and the thick oil crystallized as described in Example I using 700 ml. of boiling toluene. The total yield of product was 75%.

EXAMPLE III

*2-carboxy-2-carboxymethyl-bicyclo-[2.2.1]-hept-5-ene*

A mixture of 65 g. (0.50 m.) of itaconic acid, 36 g. (0.55 m.) of cyclopentadiene, 150 ml. of methanol and 150 ml. of water was maintained at 50° C. for fifteen hours. After this time, the volatile material was removed in vacuo, and the thick oil crystallized as described in Example I using 700 ml. of propanol. The total yield of product was 82%.

EXAMPLE IV

*2-carboxy-2-carboxymethyl-bicyclo-[2.2.1]-hept-5-ene*

A mixture of 65 g. (0.50 m.) of itaconic acid, 36 g. (0.55 m.) of cyclopentadiene, 200 ml. of water and 100 ml. of n-butanol was agitated at 95° C. for sixteen hours. After this time, the volatile material was removed in vacuo and the thick oil crystallized as in Example I using 700 ml. of water. The total yield of product was 75%.

EXAMPLE V

*2-carboxy-2-carboxymethyl-bicyclo-[2.2.1]-hept-5-ene*

A mixture of 65 g. (0.50 m.) of itaconic acid, 36 g. (0.55 m.) of cyclopentadiene, 175 ml. of water and 125 ml. of methyl ethyl ketone was agitated and refluxed for eight hours. After this time, the volatile material was removed in vacuo, and the thick oil recrystallized as in Example I using 700 ml. of 50% aqueous propanol. The total yield of product was 82%.

EXAMPLE VI

*2-carboxy-2-carboxymethyl-bicyclo-[2.2.1]-hept-5-ene*

A mixture of 65 g. (0.50 m.) of itaconic acid, 36 g. (0.55 m.) of cyclopentadiene, 150 ml. of water and 150 ml. of ethanol was maintained at 35° C. for sixteen hours. After this time, the volatile material was removed in vacuo, and the thick oil recrystallized as in Example I using 700 ml. of benzene. The total yield of product was 75%.

What is claimed is:

1. The process of producing 2-carboxy-2-carboxymethyl-bicyclo-[2.2.1]-hept-5-ene which comprises the steps of reacting substantially equimolecular proportions of cyclopentadiene and itaconic acid in an aqueous organic solvent, the organic portion of said solvent consisting of a member selected from the group consisting of alkanols and ketones containing a total of up to four carbon atoms and mixtures thereof, the amount of said organic solvent being sufficient to dissolve said cyclopentadiene and the amount of water in said aqueous organic solvent being sufficient to dissolve said itaconic acid at the reaction temperature employed, the temperature of reaction being from about 15 to about 100° C. and the time of reaction being at least two hours, and separating resulting product.

2. The process of claim 1 wherein minor proportions of an itaconic acid polymerization inhibitor are present in the reaction mixture.

3. The process of claim 1 wherein the temperature is from about 70 to about 85° C.

References Cited in the file of this patent

UNITED STATES PATENTS

| | | |
|---|---|---|
| 1,944,731 | Diels et al. | Jan. 23, 1934 |
| 2,262,002 | Hopff et al. | Nov. 11, 1941 |
| 2,454,351 | Sowa et al. | Nov. 23, 1948 |
| 2,688,021 | Jenkins | Aug. 31, 1954 |
| 2,752,361 | Robitschek | June 26, 1956 |

OTHER REFERENCES

Rodd: Chemistry of Carbon Compounds, vol. IIA (1953), pp. 340–342.